United States Patent [19]

Shyu et al.

[11] Patent Number: 5,312,613
[45] Date of Patent: May 17, 1994

[54] PROCESS FOR PRODUCING CERAMIC PRECURSOR POWDERS WITHOUT GEL FORMATION

[75] Inventors: Lieh-Jiun Shyu, Yorktown Heights; Fawzy G. Sherif, Stony Point, both of N.Y.

[73] Assignee: Akzo nv, Arnhem, Netherlands

[21] Appl. No.: 81,951

[22] Filed: Jun. 22, 1992

Related U.S. Application Data

[63] Continuation of Ser. No. 727,515, Jul. 9, 1991, abandoned.

[51] Int. Cl.$^5$ .................. C01G 25/02; C01G 27/02
[52] U.S. Cl. ...................... 423/608; 501/12; 501/103
[58] Field of Search .............. 423/81, 85, 355, 608; 501/12, 103, 134

[56] References Cited

U.S. PATENT DOCUMENTS

| | | | |
|---|---|---|---|
| 4,501,818 | 2/1985 | Rossi | 501/134 |
| 4,664,894 | 5/1987 | Suzuki et al. | 423/608 X |
| 4,810,680 | 3/1989 | Bickford et al. | 501/104 X |
| 5,004,710 | 4/1991 | Anderson | 423/608 X |
| 5,227,342 | 7/1993 | Anderson et al. | 501/12 |

*Primary Examiner*—Helene Klemanski
*Assistant Examiner*—A. Wright
*Attorney, Agent, or Firm*—Richard P. Fennelly; Louis A. Morris

[57] ABSTRACT

The addition of an aqueous solution containing one or more cations intended in a metal oxide ceramic product to a base to precipitate a calcinable metal oxide ceramic precursor reduces gelation problems during the precipitation of the precursor.

8 Claims, No Drawings

PROCESS FOR PRODUCING CERAMIC PRECURSOR POWDERS WITHOUT GEL FORMATION

This is a continuation of application Ser. No. 727,515 filed Jul. 9, 1991 now abandoned.

BACKGROUND OF THE INVENTION

It is known, in general, to produce ceramic precursor powders by precipitation of such a precursor from a homogeneous solution containing the desired cations as generally indicated in U.S. Pat. No. 4,999,323 at Col. 1, lines 5–50. However, as indicated in that patent, the products can be aggregated powders which can require further treatments such as milling and/or washing with "organic solvents". Of similar teaching is U.S. Pat. No. 4,501,818 at Col. 1, lines 17–38 and U.S. Pat. No. 5,008,092 at Col. 1, line 61 to Col. 2, line 3. One example of a literature reference in this area, which describes the fabrication of alumina-zirconia compositions from an aluminum chloride/zirconium chloride solution by the addition of ammonium hydroxide as the basic precipitation agent at a pH of up to 9, is described in Ceramic Bulletin, Vol. 68, No. 5, 1989, pp. 1017–1020.

It has been found by the present inventors that the addition of such aqueous solutions containing ceramic precursor metal cations to a basic precipitation agent can produce gelation, especially if very dilute solutions of the cations (such as employed in U.S. Pat. No. 4,810,680) are not used. For example, when yttria-stabilized zirconia is the intended product and an aqueous solution is formulated containing a predominant (e.g., about 92%) of a zirconium salt and a much lower amount (e.g., about 8%) of a yttrium salt, gelation problems can occur between pH readings of about 6 and 9 if relatively concentrated solutions are used (e.g., about 15 gm to 40 gm of metal cation (expressed as oxide per 100 ml water).

One approach to solving such gelation problems is advocated in the aforementioned U.S. Pat. No. 4,501,818 which advocates the use of a "substantially anhydrous" reaction medium with the solution of ceramic metal precursor compounds being added to the base rather than the converse. Water has been implicated in the formation of "hard agglomerates" in the washing of certain ceramic powders (i.e., zirconia) formed by the sol-emulsion-gel method (see J. Am. Ceram. Soc., 73(9) 2760–2763 (1990)).

DESCRIPTION OF THE INVENTION

It is known that most of the ceramic metal oxides have a zero point charge (ZPC) in the pH range of 2 to 7. For example, the ZPC for $SiO_2$ is 2.0, for $ZrO_2$ is 4.0, for $Al_2O_3$ is 6.9, for $TiO_2$ is 6.7 and for $Cr_2O_3$ is 7.0. A metal oxide colloid suspends in a medium with a pH close to its ZPC, and the surface of the colloidal particles is either neutral or weakly charged, so that it tends to agglomerate and form a thick gel. If the powder is suspended at a pH much greater than its ZPC, the surface charge of the particles is highly negative, so that they tend to repel one another and disperse in the solution. Utilizing this concept in the instant process, an excess of base provides a suitable environment to keep the precipitating particles well dispersed in the solution and to thereby avoid gel formation.

The present process relates to an improvement in the above-described type of ceramic precursor precipitation procedure in which an aqueous solution containing the cation or cations desired in the ceramic precursor (and ultimately the calcined ceramic) is combined with base to precipitate the precursor. The improvement of this invention involves the addition of the aqueous solution containing such cation(s) to the base solution thus maintaining the reaction medium at a relatively high pH above the ZPC of the ceramic precursor desired from the process.

The instant process avoids the scale-up problems attendant with the undesired formation of a thick, viscous gel while avoiding the use of an organic solvent reaction medium yielding a process which is more simple and economical.

The instant process is deemed broadly applicable for use with the type of aqueous solutions containing solubilized metal salts which serve as sources for the ceramic precursor (and final ceramic) metal cation component or components. For example, solubilized zirconium, yttrium, aluminum, titanium salts, either alone or in suitable combination, are representative selections which can be made for the source of the cation(s) in the desired ceramic. In the instant process, unlike U.S. Pat. No. 4,810,680, organic solvent is not used so that relatively large particles are produced (e.g., about 25 to 100 microns for agglomerated particles and about 0.5 micron for the primary particles) in contrast to the ultrafine ceramic powders (e.g., 50 Angstroms for primary particles) formed by that patent.

The type of base solution used as precipitating agent can also be selected from known solutions. Representative choices include ammonium hydroxide, which is preferred since its cation component volatilizes as ammonia during ceramic calcination, sodium hydroxide, potassium hydroxide, and the like.

Once the ceramic precursor product has been precipitated it can be calcined to form the desired metal oxide ceramic using conventional means. The product produced is suitably polymicron-sized (e.g., about 20 to about 60 microns in average particle size) it has good bulk density and good flow properties.

The following Examples illustrate certain embodiments of the present invention.

COMPARATIVE EXAMPLE 1

An aqueous zirconium acetate solution, 259.1 gm, (22% $ZrO_2$ in water) was mixed with 16.61 gm of yttrium nitrate solution ($Y(NO_3)_3$) (27.2 wt % in water) and was charged into a 2 liter reactor equipped with a mechanical agitator. The solution was stirred until the yttrium compound had dissolved. Then, 134 ml of ammonium hydroxide solution (30% $NH_4OH$ in water) was added dropwise to the solution comprising yttrium and zirconium cations. When the solution reached a pH of about 6, a thick, viscous gel formed and the stirrer became frozen. More water was added to break the gel, and the agitation speed was also increased which would be difficult operations for a scaled-up plant version of the process. The broken gel was then filtered, washed with water, oven dried at 110° C., and calcined at 1100° C. for two hours.

EXAMPLE 2

This illustrates the superior results obtained (i.e., no gel formation), as compared to the preceding Example, when the solution containing the zirconium and yttrium cations is added to the ammonium hydroxide solution rather than the latter being added to the former.

The same ammonium hydroxide solution (134 ml) was charged to the same reactor. Then, a separate solution was formed combining the same zirconium and yttrium reagents used in the preceding Comparative Example. This solution was stirred until the yttrium compound had dissolved.

The solution containing the zirconium and yttrium cations was then added dropwise to the ammonium hydroxide solution, with the stirrer set at 500 rpm, and precipitation of particulate product began, forming a fluid slurry, rather than a gel. The pH was kept at 9.5. The slurry was filtered when the addition had been completed, the product was washed with water, was dried at 110° C., and was calcined at 1100° C. for two hours. The product (yttria-stabilized zirconia) was identified as having a non-transformable tetragonal phase and had an average particle size of 56 microns, a bulk density of 2.2 gm/ml, and a flow rate of 1.2 ml/sec. It was a product which would be suitable for use in plasma spray coating applications.

EXAMPLE 3

An ammonium hydroxide solution as previously described (200 ml) was charged to a 2 liter reactor equipped with a mechanical stirrer. Then, in a separate beaker, 200 gm of zirconium carbonate paste was mixed with 12.7 gm of yttrium carbonate ($Y_2(CO_3)_3 \cdot 3H_2O$), 110 ml of acetic acid, and 112 ml of water, and the resulting solution was stirred until the solids had dissolved.

The solution containing the zirconium and yttrium cations was then added dropwise to the ammonium hydroxide solution with the stirrer set at 500 rpm. Precipitation of product took place and the pH was maintained at about 9.5. The slurry was very fluid. Once the addition had been completed, the slurry was filtered, washed with water, oven dried at 110° C., and calcined at 1100° C. for two hours. The bulk density of the powder was 2.1 g/ml, and its flow rate was 1.6 ml/sec.

EXAMPLE 4

The same procedure employed in Example 3 was used with 108 ml of formic acid being used in place of the acetic acid. The bulk density of the powder that was produced was 2.0 g/ml and its flow rate was 1.3 ml/sec.

In the case of the production of yttria-stabilized zirconia, as shown in the preceding Examples, the addition of the aqueous zirconium/yttrium-containing solution to the base (rather than the converse) keeps the pH in the area of the precipitate above the gelation pH range (about 6 to about 9) for that system thereby avoiding gelation.

We claim:

1. In a process for forming a ceramic precursor composition, suitable for calcining to form a metal oxide ceramic product, by the combining of an aqueous solution containing at least one metal cation for the ceramic with a concentration of from about 15 gm to 40 gm of metal cation, expressed as oxide, per 100 ml of water, and base precipitating agent to form a precipitate of the ceramic precursor composition, wherein the improvement comprises adding the aqueous solution to the base precipitating agent to produce a pH above the zero point charge for the precipitate and to reduce gelation during the formation of the precipitate which comprises agglomerated particles of 25 to 100 micron size.

2. A process as claimed in claim 1 wherein the base is ammonium hydroxide.

3. A process as claimed in claim 1 wherein the cation is zirconium.

4. A process as claimed in claim 1 wherein the cation is a mixture of zirconium and yttrium.

5. A process as claimed in claim 2 wherein the cation is zirconium.

6. A process as claimed in claim 2 wherein the cation is a mixture of zirconium and yttrium.

7. A process as claimed in claim 4 wherein the pH during precipitation is kept above about 9.

8. A process as claimed in claim 6 wherein the pH during precipitation is kept above about 9.

* * * * *